D. R. BOWEN AND C. F. SCHNUCK.
RUBBER MIXER.
APPLICATION FILED JAN. 13, 1919.

1,355,885.

Patented Oct. 19, 1920.
4 SHEETS—SHEET 1.

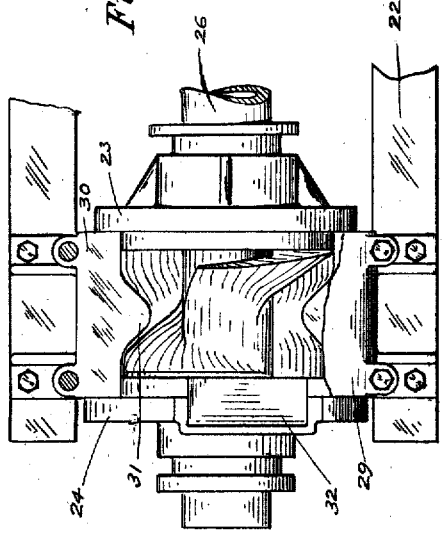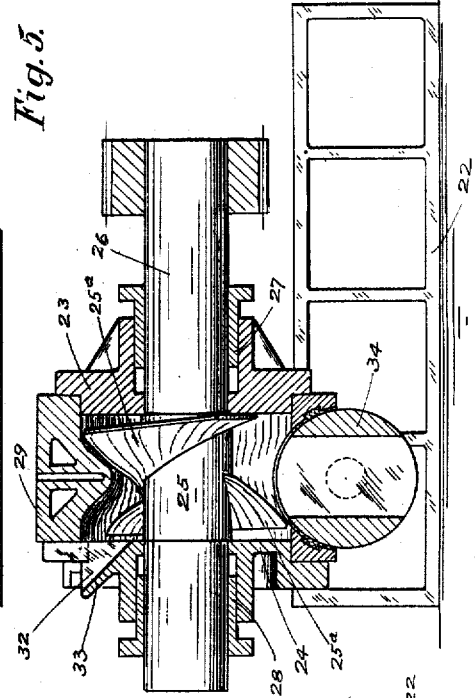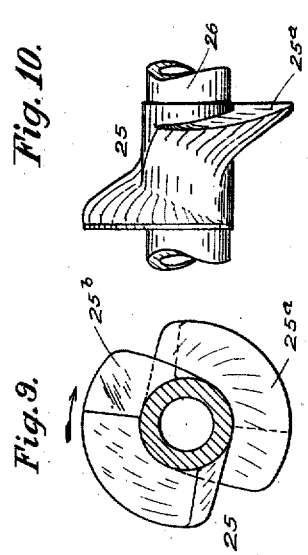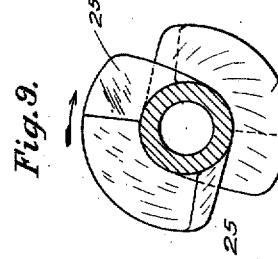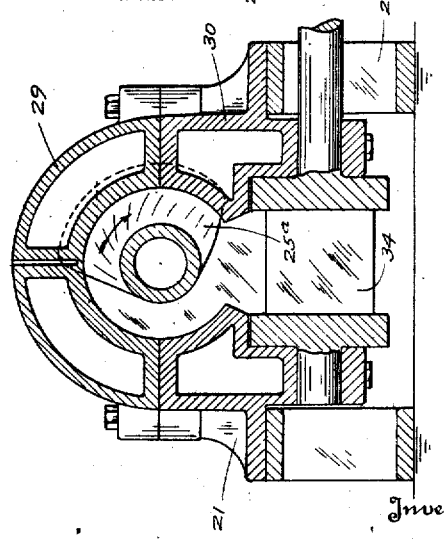

D. R. BOWEN AND C. F. SCHNUCK.
RUBBER MIXER.
APPLICATION FILED JAN. 13, 1919.
1,355,885.
Patented Oct. 19, 1920.
4 SHEETS—SHEET 4.
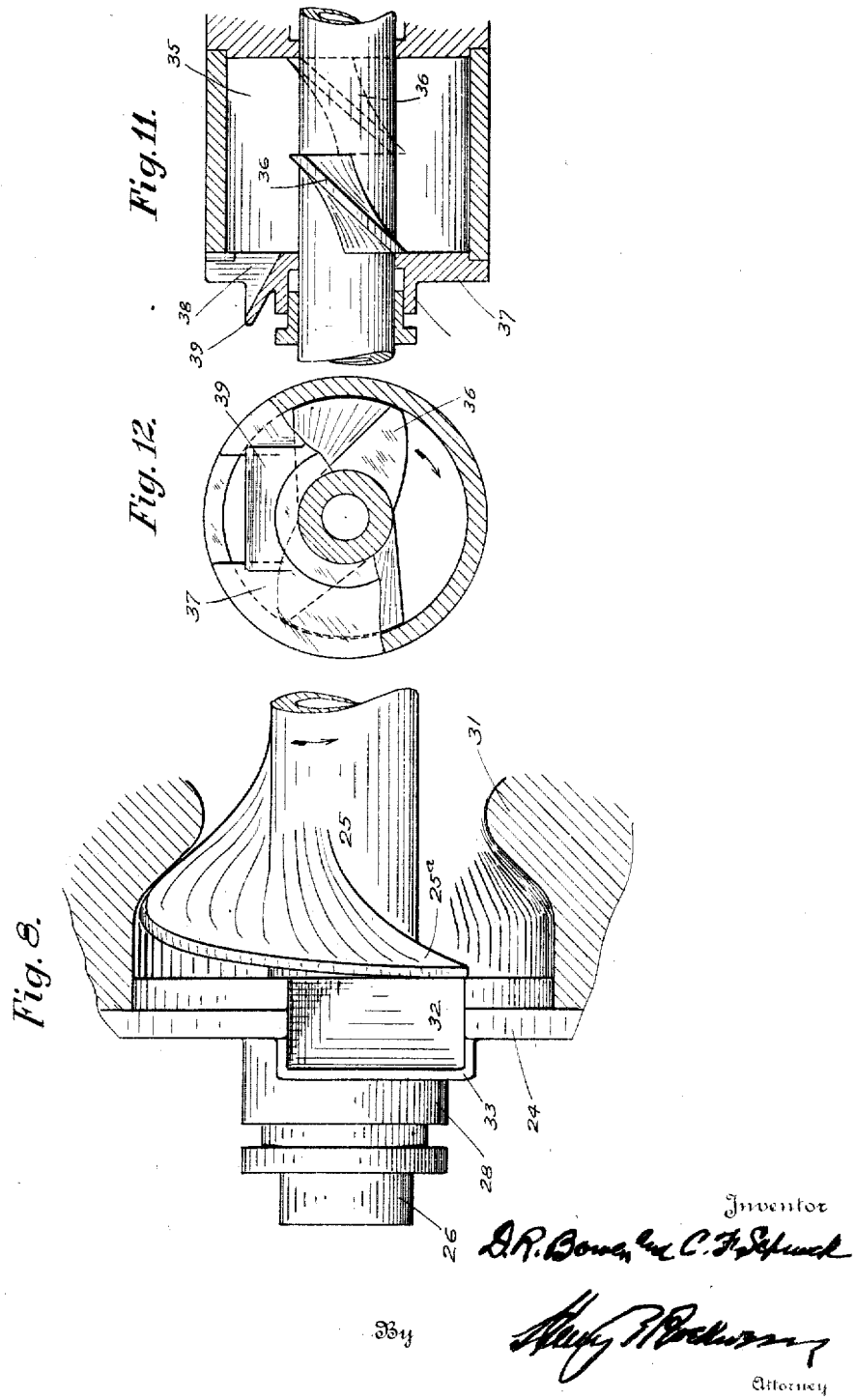

UNITED STATES PATENT OFFICE.

DAVID R. BOWEN AND CARL F. SCHNUCK, OF ANSONIA, CONNECTICUT, ASSIGNOR TO FARREL FOUNDRY AND MACHINE COMPANY, OF ANSONIA, CONNECTICUT, A CORPORATION OF CONNECTICUT.

RUBBER-MIXER.

1,355,885.　　　Specification of Letters Patent.　　Patented Oct. 19, 1920.

Application filed January 13, 1919. Serial No. 270,837.

*To all whom it may concern:*

Be it known that we, DAVID R. BOWEN and CARL F. SCHNUCK, both citizens of the United States, and both residing in Ansonia, county of New Haven, State of Connecticut, have invented certain new and useful Improvements in Rubber-Mixers, of which the following is a full, clear, and exact description.

This invention relates to machines for mixing or masticating heavy plastic material, and it has special reference to a machine for use in rubber manufacture, wherein rubber, (usually in the form of rather large chunks), is reduced and mixed with a powdered filler or coloring agent. The present improvements relate more especially to the means whereby the material to be treated is introduced or charged into the working chamber in which the mixing operation takes place under the action of a suitable rotary mixing element. The material is worked back and forth in the chamber by one or more blades on the rotor until the rubber is reduced to the desired plasticity and the powder is thoroughly and uniformly incorporated therewith.

One of the main objects of our invention is to furnish a machine of this type wherein the material can be charged into the mixing chamber in a very simple, convenient and satisfactory manner.

Another object of the invention is to furnish a machine in which the blowing out of the powder from the mixing chamber during the operation of mixing is avoided. Heretofore, it has been customary to hold the mass against the rotor blades by means of a piston or similar pressure device or follower, during the rotation of the rotor. An arrangement of that kind has the disadvantage that owing to the displacement of air substantially throughout the interior of the mixing chamber, due to the movement of the piston or the like, the fine powder is blown out of the chamber through any small cracks or leaks that may exist. Under these circumstances, it has been considered necessary to make the mixing chamber as air-tight as possible during the mixing, but the results have not been satisfactory, in spite of the care taken and the expense incurred in providing tight joints and bearings. The powder used in mixing rubber is so fine that when the air in the mixing chamber is displaced by the movement of a pressure piston or weight for holding the mass against the rotor, the powder will be expelled through even a small crack or opening, causing an objectionable dust cloud. The charging of the atmosphere with powder is one of the greatest drawbacks of rubber mixing, because it makes working conditions so disagreeable and unhealthful. The blowing of the powder into and through the bearings of the mixer is also highly undesirable on account of the difficulty of keeping the rotor shaft properly lubricated.

One aim of our invention is to overcome the above mentioned drawbacks by providing a machine, and a method of operating the same, whereby the rubber and powder are charged into the mixing chamber and held in contact with the rotor without the use of any movable pressure means other than the rotor itself. The rubber and the powder are both fed into the mixing chamber by gravity in connection with a certain amount of agitation or drawing in action produced by the rotor in its rotation. Additional rubber or additional powder or both can be added to the batch at any time during mixing in a most convenient way and the formation of an objectionable dust cloud is avoided at all times.

To these and other ends the invention consists in the novel features and combinations of parts to be hereinafter described and claimed.

In the accompanying drawings:

Fig. 5 is a vertical central section showing the discharge valve in the open position.

Fig. 6 is a transverse vertical section of the machine shown in Fig. 5.

Fig. 7 is a top plan view of the machine with the upper casing section broken away.

Fig. 8 is an enlarged view of certain parts shown in Fig. 7, with the rotor in a somewhat different position with regard to the feed hopper.

Figs. 9 and 10 are details of the rotor, and

Figs. 11 and 12 are a vertical longitudinal section and a sectional end elevation respectively of a machine of somewhat modified form.

Figure 1:
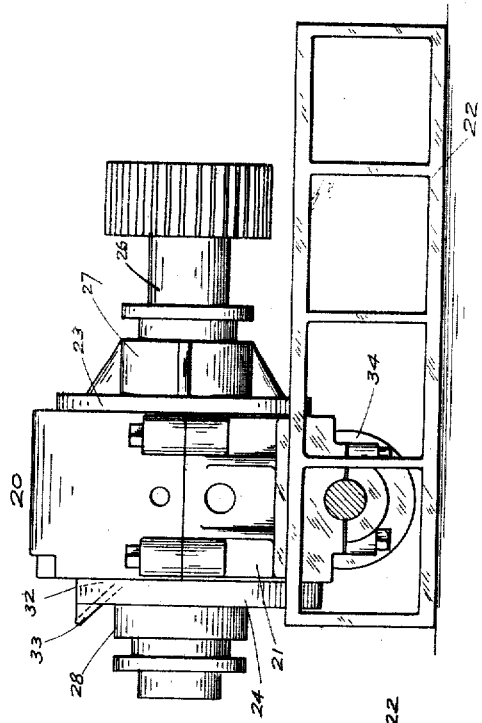
Figure 1 is a front elevation of a rubber mixer embodying our invention.
Figure 2:
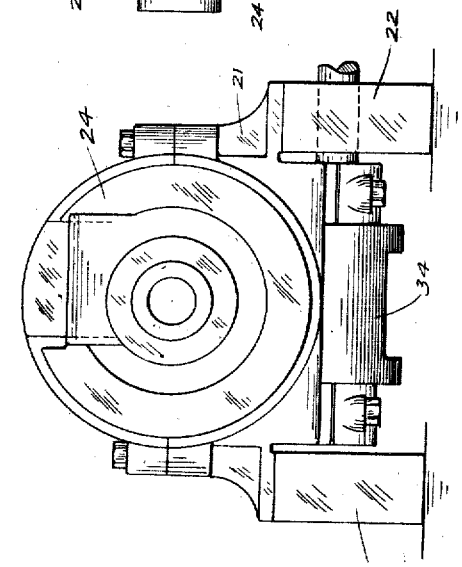
Fig. 2 is an end elevation of the same looking from the left of Fig. 1.
Figure 3:
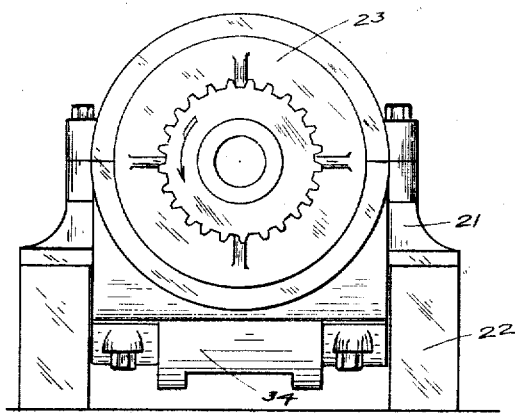
Fig. 3 is an end elevation looking from the right of Fig. 1.
Figure 4:
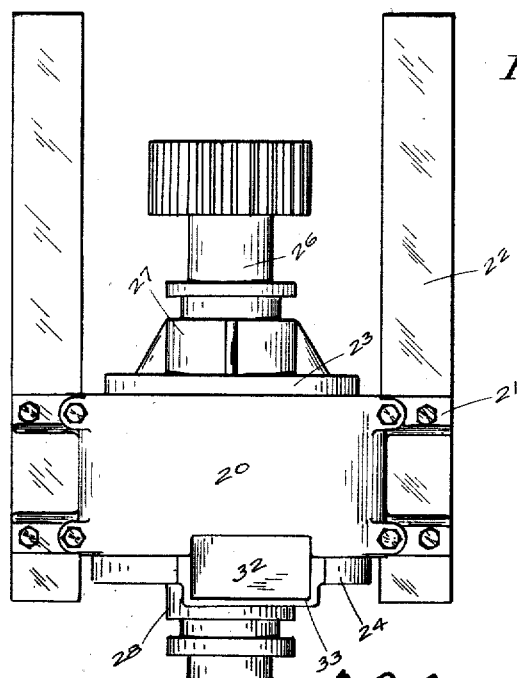
Fig. 4 is a top plan view.

In the present machine, the casing 20, having the mixing chamber, is of generally cylindrical shape and is mounted by lugs 21 on a pair of side frames 22. The mixing chamber has heads 23, 24, which close the chamber or cylinder at the respective ends. A rotary mixing element or rotor 25 having a horizontal shaft 26 with bearings 27, 28, in the respective cylinder heads is arranged within the mixing cylinder. The mixer casing is divided horizontally in a lengthwise direction and includes an upper section 29 and a lower section 30. The mixing chamber is provided with an intermediate transverse extrusion rib 31. The rotor 25 is provided with blades 25$^a$ diametrically located on the rotor shaft, one of said blades being located on one side of the extrusion rib and the other being located on the other side. These blades are arranged at such an angle on the shaft as to work the material back and forth in the mixing chamber and squeeze it through the space between the extrusion rib and the intermediate part of the rotor. The blades make substantial contact with the respective end walls of the mixing chamber and each blade has a working face which forces the material against one side of the rib toward the center of the chamber. In this manner the material is pressed and squeezed back and forth in the mixing chamber by the rotor blades. It will be observed that the length of the mixing chamber is small when the diameter of the chamber is considered, the extrusion rib taking up the greater part of the length of the chamber side wall. The angle between the rotor blade and the rotor axis is approximately 80° in the embodiment shown in Figs. 1–10.

The charging opening into which the rubber and powder are introduced is located in one of the cylinder heads. In the form shown, it is located in the upper part of the cylinder head 24, and is indicated at 32. The heads 23, 24 are preferably formed separately from the side wall of the mixing chamber and are held detachably in place by bolts or the like, which we have not considered it necessary to illustrate. The charging opening 32 is located at the lower part of a charging hopper 33, which in this instance is formed as an integral part of the head 24, in that part of the head located above the rotor shaft. The opening 32 is immediately adjacent an end edge of one of the blades 25$^a$ at some time during the rotation of such blade and is arranged to be opened and closed by the blade in its rotation, as shown more particularly in Fig. 8.

The blade has at its end a substantially flat surface 25$^b$, which rotates in contact with the inner face of the cylinder head. This substantially flat blade surface cuts off or reduces the charging opening during a small fraction of the rotation of the blade and then as said flat surface passes beyond the charging opening, the latter is uncovered and the material in the hopper 33, which passes down into the bottom of said hopper by gravity, drops into the void at the rear surface of the blade, whence it is taken up by the blade on its further rotation and thoroughly mixed by being forced against the side wall of the chamber, as previously described.

It will be observed that the leading portion of the blade, which is located adjacent the charging opening, is approximately perpendicular to the rotor axis, as shown in Fig. 8, so that the blade is adapted intermittently to cut off the incoming material.

At the lower part of the mixing chamber a suitable closure is provided for controlling the discharge after mixing. This closure may take the form of a rotary valve 34, such as described in our application, Serial No. 208,635, but it will be understood that the means for discharging the chamber forms no part of the present invention.

The casing and rotor are preferably provided with passages for the circulation of cooling water, so that the vulcanization of the rubber, due to heat generated by friction, can be prevented.

The operation of the machine is substantially as follows:

Supposing that the discharge closure 34 is in the closed position and that the rotor is rotating, the rubber is charged into the chamber by way of the hopper 33 and the powder is then fed in after it through the same hopper so as to be incorporated with the rubber as the latter is reduced to a plastic mass. This is a convenient way of starting the operation, but it will be understood that the rubber and powder can be introduced at the same time, if desired, or the powder may be introduced first. When the material is dumped into the hopper 33, it will be momentarily held in the hopper if the flat surface 25$^b$ of the adjacent rotor blade is opposite the charging opening, but if not, the material, either rubber or powder, or both, will pass freely into the interior of the mixing chamber, partly by gravity and partly owing to the agitation or drawing in action produced by the rotation of the blade in the mixing chamber. The material thus passes freely into vacant space or void at the rear of the blade and it is taken up by the front face of the blade on further rotation of the latter and squeezed against the extrusion rib and extruded between said rib and the rotor toward and past the center of the chamber, whereupon such material is then taken up by the blade in the other end of the chamber and forced back again, this operation being repeated as long as necessary. When the batch has been thoroughly mixed, it is discharged from the machine by moving the valve 54 to the open position, as shown in Fig. 5.

With a batch of proper size in the chamber, the spaces at the rear faces of the rotor blades 25² are not completely filled with material, and in such spaces there are areas of low pressure caused by the rotation of the blades, into which areas the material to be mixed can be readily introduced. It has been found that in the operation of mixing, there is no expulsion of the powder through the charging opening in spite of the fact that the blade at the opposite end of the chamber is continually forcing the material in the general direction of said charging opening. Before the material can reach the charging opening, so as to be discharged therefrom, it is caught up by the other blade and forced back again into the first mentioned end of the chamber. Moreover there is very little tendency for the powder to flow out of the charging opening, because owing to the direct way in which the powder is supplied to the chamber, it becomes incorporated with the rubber almost immediately and the action of the blade or blades in that end of the chamber, which is adjacent the charging opening, is such as to produce a gradual drawing action into the chamber, rather than an expulsive action. In other words, the expulsive action of the blade or blades, in what may be termed the far end of the chamber, with regard to the charging opening, is neutralized by the gradual drawing in effect produced by the blade or blades adjacent the charging opening.

Our invention is of considerable importance, in so far as it overcomes the blowing out of an objectionable dust cloud from the machine, and in so far as it simplifies the construction of the machine very materially and reduces its cost.

In Figs. 11 and 12, we have shown a modification of the machine wherein the transverse extrusion rib is omitted. In this case, the chamber 35 has a cylindrical inner surface against which the material is mashed or smeared by blades 36, while being worked back and forth. The cylinder head 37, however, is provided with a charging opening 38 and hopper 39 similar to those previously described. In this case also, the charging opening is located above the shaft where it is readily accessible for the introduction of the rubber and powder, the arrangement being such that the material moves directly from the hopper into the mixing chamber without having to pass through any intermediate passage. Material dumped into the hopper passes by gravity in a downward and inward direction directly into the mixing chamber. The hopper is open at the top and has an open side located in a substantially vertical plane and in free communication with the mixing chamber. The hopper is carried by one of the cylinder heads, in the preferable form, and it can be conveniently made as an integral part of the cylinder head. In a radial direction the opening at the side of the hopper extends substantially to the inner surface of the mixing chamber side wall, approximating in radial measurement the distance between the inner surface of the chamber side wall and the rotor body, so as to permit comparatively large chunks of rubber to be introduced into the chamber. The charging opening is also wide enough to receive large chunks with facility, its width in the example shown being greater than the distance between the chamber side wall and the rotor shaft or body. The width of the charging opening should at any rate approximate the distance between the chamber side wall and the rotor shaft or body. These features, however, while important in some aspects of the invention are unimportant in others.

We do not claim broadly herein the combination of a working chamber, bladed rotor and transverse extrusion rib, as claimed in our application Serial No. 191,418; nor do we claim broadly herein the combination of a working chamber, and a bladed rotor in said chamber for moving the material back and forth, said chamber having an opening in one of its end walls for the ingress of material to be treated, said opening being located in the path of one of the rotor blades, as claimed in our application, Serial No. 270,888, nor do we claim broadly herein the feature of providing a charge container at the end of the working chamber to receive chunks of rubber to be supplied to said working chamber, said working chamber and said charge container being in direct communication with each other by way of an opening curved about the rotor shaft, through which the rubber chunks to be treated pass freely and directly from the charge container to the working chamber, as claimed in our application Serial No. 208,635.

Various changes may be made in the details of the machine without departing from the scope of our invention, as defined in the claims.

What we claim is:

1. In a rubber mixer, a working chamber, a rotor therein having blades for moving the material back and forth in said chamber, said chamber having an opening in one of its end walls for the feeding in of material to be treated, and a hopper on the end wall of the chamber, said hopper having an opening at its inner side coinciding with said first named opening.

2. In a rubber mixer, a working chamber, a rotor shaft therein having blades for moving the material back and forth in said chamber, said chamber having an opening in one of its end walls located substantially above said shaft for the introduction of rubber and powder.

3. In a rubber mixer, a working chamber, a rotor shaft therein having blades for moving the material back and forth in said chamber, said chamber having an opening in one of its end walls located substantially above said shaft for the introduction of rubber and powder, and a hopper on the end wall of the chamber open at its inner side and in direct communication with said first named opening.

4. In a rubber mixer, a working chamber, a rotor therein for moving the material back and forth in said chamber, said chamber having a detachable head, and an open sided hopper carried by said head and in direct communication with the interior of the chamber.

5. In a rubber mixer, a working chamber, a rotor therein having blades for forcing the material alternately back and forth in said chamber, and a detachable head for said chamber having a charging opening and an open sided hopper integral with the head in proximity to said opening.

6. In a rubber mixer, a working chamber, a rotary mixing element therein having blades for forcing the material alternately from one end of the chamber to the other, said chamber having an end opening of considerable size located substantially above the rotor shaft for the introduction of rubber and powder, the depth of said opening approximating the radial distance from the inner surface of the chamber side wall to the rotor shaft.

7. In a rubber mixer, the combination of a casing providing a working chamber, a horizontal rotor in said casing having blades for working the material from one end of the chamber to the other and back again, said chamber having an opening in one of its end walls for the introduction of rubber and powder controlled by one of said blades, said opening approximating in depth the distance between the inner surface of the chamber side wall and the body of the rotor.

8. In a rubber mixer, the combination of a casing providing a working chamber, a horizontal rotor in said casing having blades for working the material from one end of the chamber to the other and back again, said chamber having an opening in one of its end walls for the introduction of rubber and powder controlled by one of said blades, said opening approximating in width the distance between the inner surface of the chamber side wall and the body of the rotor.

9. In a rubber mixer, the combination of a casing providing a working chamber, a horizontal rotor in said casing having blades for working the material from one end of the chamber to the other and back again, said chamber having an opening in one of its end walls for the introduction of rubber and powder controlled by one of said blades, said opening approximating in depth and width the distance between the inner surface of the chamber side wall and the body of the rotor, whereby comparatively large chunks of rubber may be introduced into the chamber by way of said opening.

10. In a rubber mixer, a casing providing a working chamber, a horizontal rotor in said chamber for moving material back and forth, said chamber having a detachable end wall with an opening therein for the introduction of rubber chunks and powder, said opening approximating in depth and with the distance between the inner surface of the chamber side wall and the rotor body, and a hopper on the end wall having a side opening coinciding with said first named opening.

11. The method of mixing rubber, which comprises working the mass against the side wall of a mixing chamber by means of a rotating blade, and introducing rubber and powder into the chamber in the void at the rear face of the blade through the end wall of the chamber.

12. The method of introducing material to be mixed into a rubber mixer having a mixing chamber and a rotary blade therein, which comprises feeding all of the ingredients of the mixture directly into the space behind the rotating blade.

13. The method of introducing material to be mixed into a rubber mixer having a mixing chamber and a rotary blade therein, which comprises feeding all of the ingredients of the mixture directly into the space behind the rotating blade through the end wall of the mixing chamber.

14. The method of mixing rubber in a mixer having a mixing chamber and rotating blades therein for working the material back and forth in said chamber, which comprises feeding rubber and powder through one of the end walls of the mixing chamber into the vacant space at the rear of one of the blades.

15. The method of mixing rubber in a mixer having a mixing chamber and rotating blades therein for working the material back and forth in said chamber, which comprises feeding rubber chunks through one of the end walls of the mixing chamber into the vacant space at the rear of one of the rotating blades.

16. The method of mixing rubber in a suitable mixing chamber by means of rotating blades which work the material back and forth in said chamber, which comprises feeding rubber and powder by gravity directly into the end of the mixing chamber at a point in the path of rotation of one of said blades, so that the rubber and powder can be drawn into the space at the rear of the rotating blade.

17. The method of mixing rubber which comprises working the mass against the side wall of a mixing chamber by means of a rotating blade and introducing additional rubber into the chamber in the void at the rear face of the rotating blade during the mixing.

18. In a rubber mixer, a working chamber, a rotor therein having blades which force the material back and forth in said chamber, the diameter of the chamber being continuously reduced from substantially the ends thereof to the middle of said chamber.

19. In a rubber mixer, a working chamber symmetrically reduced in cross section substantially from the ends to a point intermediate the ends, and a rotor working in said chamber having mashing blades to mash the material against the side wall of the chamber.

20. In a rubber mixer, a working chamber, a rotor therein for working the material back and forth, and an extrusion rib extending substantially throughout the length of the chamber.

21. In a rubber mixer, a mixing chamber of relatively large diameter compared to its length having an interior transverse extrusion rib taking up the greater part of the length of the chamber side wall, and a rotor in said chamber having blades coöperating with said rib.

22. In a machine of the character described, a working chamber, having a feed opening at the end, and a rotor in said chamber for working the material back and forth, having a blade with a leading end portion adjacent said charging opening arranged approximately perpendicular to the rotor axis.

23. In a machine of the character described, a working chamber in the shape of a drum, the length of which is no greater than the diameter, and a rotor in said chamber having blades for working the material back and forth in the latter, said blades with their leading ends approximately perpendicular to the rotor shaft.

24. In a rubber mixer, a working chamber, a rotor therein for working the material back and forth, and blades on said rotor arranged at an angle of approximately 80° to the rotor axis.

25. In a rubber mixer, a mixing chamber of considerable diameter compared to its length having an extrusion rib taking up the greater part of the length of the chamber, a rotor in said chamber, and blades on said rotor coöperating with said rib at opposite sides thereof and arranged at an angle of approximately 80° to the rotor axis.

In witness whereof, we have hereunto set our hands on the 8th day of January, 1919.

DAVID R. BOWEN.
CARL F. SCHNUCK.